United States Patent
Hong

(10) Patent No.: US 10,176,673 B2
(45) Date of Patent: Jan. 8, 2019

(54) DART GAME APPARATUS AND DART GAME METHOD FOR PROVIDING GAME MODE INTERWORKED WITH MOBILE GAME AND COMPUTER-READABLE MEDIUM THEREOF

(71) Applicant: HONG INTERNATIONAL CORP., Seoul (KR)

(72) Inventor: Sang Uk Hong, Seoul (KR)

(73) Assignee: Hong International Corp., Seoul (KR)

( * ) Notice: Subject to any disclaimer, the term of this patent is extended or adjusted under 35 U.S.C. 154(b) by 0 days.

(21) Appl. No.: 15/505,232

(22) PCT Filed: Aug. 19, 2015

(86) PCT No.: PCT/KR2015/008663
§ 371 (c)(1),
(2) Date: Feb. 20, 2017

(87) PCT Pub. No.: WO2016/028084
PCT Pub. Date: Feb. 25, 2016

(65) Prior Publication Data
US 2017/0178452 A1    Jun. 22, 2017

(30) Foreign Application Priority Data
Aug. 19, 2014 (KR) .................. 10-2014-0107708

(51) Int. Cl.
*G06F 17/00* (2006.01)
*G07F 17/32* (2006.01)
(Continued)

(52) U.S. Cl.
CPC ........ *G07F 17/3255* (2013.01); *A63F 13/245* (2014.09); *A63F 13/65* (2014.09);
(Continued)

(58) Field of Classification Search
None
See application file for complete search history.

(56) References Cited

U.S. PATENT DOCUMENTS 7,985,125 B2 * 7/2011 Kagami ................ F41J 3/0042
273/373
2005/0209008 A1 9/2005 Shimizu et al.
(Continued)

FOREIGN PATENT DOCUMENTS

JP 2006-142054 A 6/2006
JP 2013-154085 A 8/2013
(Continued)

OTHER PUBLICATIONS

Notice to File a Response for Korean Patent Application No. 10-2014-0107708 dated Sep. 24, 2015 (translated), Korean Intellectual Property Office (KIPO), 7 pgs.
(Continued)

*Primary Examiner* — Ronald Laneau
(74) *Attorney, Agent, or Firm* — Martin & Ferraro, LLP

(57) ABSTRACT

Disclosed is a dart game apparatus providing a game mode interworked with a mobile game. The dart game apparatus may include: a controller recognizing information on a player and determining providing a reward to the player at least partially based on dart game execution data of the player; and a network connection unit transmitting data associated with the reward to at least one of a dart game server, a mobile game server, and a mobile terminal. The reward may include the reward for a game executed on the mobile terminal.

14 Claims, 11 Drawing Sheets

(51) Int. Cl.
*G06Q 50/10* (2012.01)
*F41J 3/00* (2006.01)
*F41J 5/04* (2006.01)
*G06Q 30/02* (2012.01)
*A63F 13/245* (2014.01)
*A63F 13/65* (2014.01)
*A63F 13/92* (2014.01)

(52) U.S. Cl.
CPC .............. *A63F 13/92* (2014.09); *F41J 3/0009* (2013.01); *F41J 5/04* (2013.01); *G06Q 30/0209* (2013.01); *G06Q 50/10* (2013.01); *G07F 17/3211* (2013.01); *G07F 17/3223* (2013.01); *G07F 17/3227* (2013.01); *G07F 17/3295* (2013.01)

(56) References Cited

U.S. PATENT DOCUMENTS

| | | | |
|---|---|---|---|
| 2012/0083342 A1 | 4/2012 | Cross et al. | |
| 2012/0315986 A1 | 12/2012 | Walling | |
| 2013/0210507 A1* | 8/2013 | Wayans | A63F 13/06 463/7 |
| 2016/0271499 A1* | 9/2016 | Higo | A63F 13/00 |
| 2017/0189810 A1* | 7/2017 | Hong | F41J 3/00 |
| 2018/0001195 A1* | 1/2018 | Watanabe | A63F 13/45 |

FOREIGN PATENT DOCUMENTS

| | | |
|---|---|---|
| KR | 10-2004-0013864 | 2/2004 |
| KR | 10-2007-0062658 | 6/2007 |
| KR | 10-2012-0035747 | 4/2012 |
| KR | 10-2012-0090374 | 8/2012 |
| KR | 10-2013-0062456 | 6/2013 |
| WO | WO2013/082546 | 6/2013 |

OTHER PUBLICATIONS

International Search Report for PCT/KR2015/008663 dated Jan. 14, 2016, 2 pgs.
Supplementary European Search Report for Application No. 15834576.9 (PCT/KR2015/008663), dated Feb. 1, 2018.
Notification of Reasons for Refusal for Japanese Patent Application No. 2017-504182, Japanese Patent Office, with translation, dated Feb.6, 2018.

* cited by examiner

DART GAME APPARATUS AND DART GAME METHOD FOR PROVIDING GAME MODE INTERWORKED WITH MOBILE GAME AND COMPUTER-READABLE MEDIUM THEREOF

This is a National Phase Application under 35 USC 371 of PCT/KR2015/008663 filed Aug. 19, 2015 (published on Feb. 25, 2016 as WO 2016/028084); which claims priority to Korean Application No. 10-2014-0107708 filed Aug. 19, 2014; all of which are incorporated by reference herein in their entirety.

TECHNICAL FIELD

The present disclosure relates to a dart game apparatus, and more particularly, to providing a game mode which may be interworked with a mobile game to a user.

BACKGROUND ART

In general, a dart refers to a 'small arrow' and a dart game is a game that involves scoring points by throwing an arrow-shaped dart to a circular target marked with figures. A dart game has an advantage in that anybody can enjoy the dart game anytime and anywhere if only an arrow-headed dart and a dart target are available. In recent years, as various game methods have been developed and a scoring method has been organized, the dart game has been developed as worldwide leisure sports, and therefore, men and women of all ages have conveniently enjoyed the dart game.

In general, participants of the dart game need to participate in the game at the same time and in the same space in order to enjoy the dart game. However, with the development of communication technology, electronic dart game apparatuses have been developed in which each of the participants of the dart game may remotely participate in the dart game so as to participate in the game over temporal and spatial constraints and remotely transmit a play result or a play process thereof through a communication network. The electronic dart game apparatuses may electrically sense a hitting point of the dart target and automatically aggregate scores and provide the aggregated scores to a player.

Apart from that, with the development of a mobile terminal, various games which may be executed in the mobile terminal have been released and with the development of communication technology, multi-access online games (for example, a massive multiplayer online role playing game (MMORPG) executed even in the mobile terminal have been released. With the development of the communication technology, there are needs for new recreation cultures.

In general, games implemented in the mobile terminal have been developed in the mobile terminal and the dart game has been developed in its way, but a dart game mode to interwork the mobile game and the dart game may be required in the art in order to cope with the needs of the new recreation cultures.

DISCLOSURE

Technical Problem

The present disclosure has been made in an effort to provide a dart game mode which may be interworked with a mobile game in a dart game apparatus. The present disclosure has been made in an effort to allow a player to enjoy a dart game in which an entertainment aspect is enforced by interworking a dart game and a mobile game.

The present disclosure has been made in an effort to allow a player to enjoy a mobile game in which an entertainment aspect is enforced by interworking a dart game and a mobile game.

Technical Solution

An embodiment of the present disclosure provides an electronic dart game apparatus which may provide a dart game mode which may operate by interworking with a mobile game to a user. The electronic dart game apparatus may include: a controller recognizing information on a player and determining providing a reward to the player at least partially based on dart game execution data of the player; and a network connection unit transmitting data associated with the reward to at least one of a dart game server, a mobile game server, and a mobile terminal. The reward may include the reward for a game executed on the mobile terminal.

Another embodiment of the present disclosure provides a method for providing a dart game mode which may operate by interworking with a mobile game. The method may include: recognizing the information on the player; determining providing a reward to the player at least partially based on dart game execution data of the player; and transmitting data associated with the reward to at least one of a dart game server, a mobile game server, and a mobile terminal. The reward may be used in a game executed on the mobile terminal.

Yet another embodiment of the present disclosure provides a computer-readable medium storing commands for allowing a computer to provide a dart game mode which may operate by interworking with a mobile game. The commands may include: a command for allowing the computer to recognize information on a player; a command for allowing the computer to determine providing a reward to the player at least partially based on dart game execution data of the player; and a command for allowing the computer to transmit data associated with the reward to at least one of a dart game server, a mobile game server, and a mobile terminal. The reward may be used in a game executed on the mobile terminal.

Still yet another embodiment of the present disclosure provides an electronic dart game apparatus which may provide a dart game mode which may operate by interworking with a mobile game to a user. The electronic dart game apparatus may include: a controller recognizing information on a player, creating or loading a character of the player, and determining providing a reward to the character at least partially based on dart game execution data of the player; and a network connection unit transmitting data regarding a character to which the reward is provided to at least one of a dart game server, a mobile game server, and a mobile terminal.

Further, still yet another embodiment of the present disclosure provides a method for providing a dart game mode which may operate by interworking with a mobile game. The method may include: recognizing information on a player; creating or loading a character of the player; determining providing a reward to the character at least partially based on dart game execution data of the player; and transmitting data regarding the character to which the reward is provided to at least one of a dart game server, a mobile game server, and a mobile terminal.

Additionally, still yet another embodiment of the present disclosure provides a computer-readable medium storing commands for allowing a computer to provide a dart game mode which may operate by interworking with a mobile game. The commands may include: a command for allowing the computer to recognize information on a player; a command for allowing the computer to create or load a character of the player; a command for allowing the computer to determine providing a reward to the character at least partially based on dart game execution data of the player; and a command for allowing the computer to transmit data regarding the character to which the reward is provided to at least one of a dart game server, a mobile game server, and a mobile terminal.

Still yet another embodiment of the present disclosure provides an electronic dart game server which may provide a dart game mode which may operate by interworking with a mobile game to a user. The server may include: a controller recognizing information on a player and determining providing a reward to the player at least partially based on game execution data of the player; and a network connection unit receiving the game execution data from a dart game apparatus and transmitting data associated with the reward to at least one of a mobile game server and a mobile terminal. The reward may include the reward for a game executed on the mobile terminal.

Still yet another embodiment of the present disclosure provides an electronic dart game server which may provide a dart game mode which may operate by interworking with a mobile game to a user. The server may include: a controller recognizing information on a player, creating or loading a character of the player, and determining a reward to be provided to the character of the player at least partially based on dart game execution data of the player; a memory unit storing data regarding the character to which the reward is provided; and a network connection unit receiving the game execution data from a dart game apparatus and transmitting data regarding the character to at least one of a mobile game server and a mobile terminal.

Advantageous Effects

Contrived in response to the aforementioned prior art, the present invention provides a dart-gaming mode in which a dart-gaming machine is able to interoperate with mobile games.

The present disclosure may allow a player to enjoy a dart game in which an entertainment aspect is reinforced by interworking a dart game and a mobile game.

The present disclosure may allow a player to enjoy a mobile game in which an entertainment aspect is reinforced by interworking a dart game and a mobile game.

DESCRIPTION OF DRAWINGS

Various aspects are now described with reference to the drawings and like reference numerals are generally used to designate like elements. In the following embodiments, for description, multiple specific detailed matters are presented to provide general understanding of one or more aspects. However, it will be apparent that the aspect(s) can be executed without the detailed matters. In other examples, known structures and apparatuses are illustrated in a block diagram form in order to facilitate description of the one or more aspects.

BEST MODE

Figure 1:
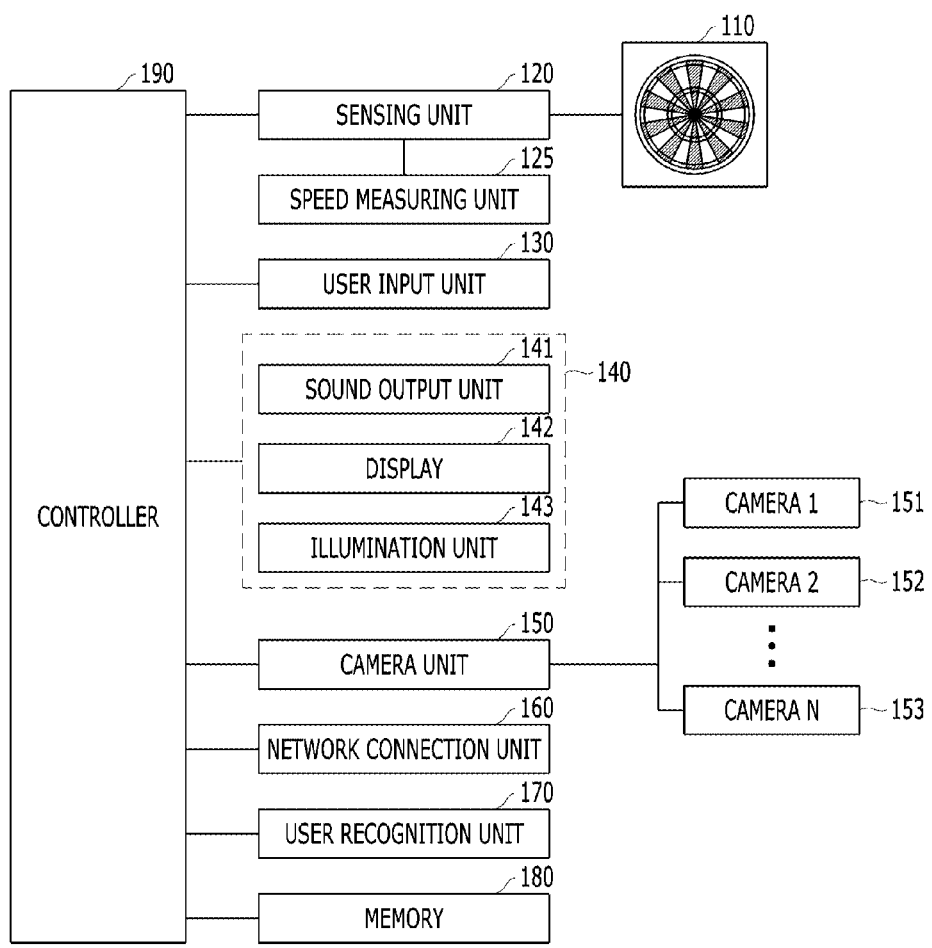
FIG. 1 is a block diagram of a dart game apparatus according to an embodiment of the present disclosure.

Various embodiments will now be described with reference to the drawings and similar reference numerals are used to represent similar elements throughout the drawings. In the specification, various descriptions are presented to provide appreciation of the present disclosure. However, it is apparent that the embodiments can be executed without the specific description. In other examples, known structures and apparatuses are presented in a block diagram form in order to facilitate description of the embodiments.

"Component", "module", "system", and the like which are terms used in the specification designate a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or execution thread and one component may be localized in one computer or distributed among two or more computers. Further, the components may be executed by various computer-readable media having various data structures, which are stored therein. The components may perform communication through local and/or remote processings according to a signal (for example, data through other system and a network such as the Internet through data and/or a signal from one component that interacts with other components in a local system and a distribution system) having one or more data packets, for example.

The description of the presented embodiments is provided so that those skilled in the art of the present disclosure can use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is consistent with the principles and new features presented herein.

The terms "dart" and "dart pin" used in the specification may be used interchangeably. Moreover, the terms "player" and "user" used in the specification may also be used interchangeably. Moreover, the terms "point" and "area" used in the specification may also be used interchangeably. Moreover, the terms "game executed in mobile terminal" and "mobile game" used in the specification may also be used interchangeably.

FIG. 1 is a block diagram of a dart game apparatus according to an embodiment of the present disclosure.

The dart game apparatus 100 may include a dart target 110, a sensing unit 120, a speed measuring unit 125, a user input unit 130, an output unit 140, a camera unit 150, a network connection unit 160, a user recognition unit 170, a memory 180, a controller 190, and the like. The components illustrated in FIG. 1 are not essential components. Therefore, a mobile terminal having more components than or less components than illustrated in FIG. 1 may be implemented.

Hereinafter, the components will be described in sequence.

The dart target 110 may include a score board in which a bullseye is positioned at the center and there are areas segmented by concentric circles centered at the bullseye and straight lines extending radially from the bullseye and individual scores are assigned to the areas, respectively. Multiple holes into which a tip of a dart may be inserted may be formed on the score board.

The dart target 110 includes a display module 142 to be described below to variably change score deployments of the dart target 110 and shapes of areas to which the scores have been assigned. In this case, the dart target 110 includes a light transmissive touch pad in the display module 142 to be stacked to take a form of a touch screen.

The sensing unit 120 may sense a play of a dart game player performed with respect to the dart target 110. The sensing unit 120 may sense a hit location of a dart pin so as to actually evaluate the play of the game player. The sensing unit 120 may sense which area of the dart target 110 a thrown dart hits, with respect to a play in which the game player throws the dart. The sensing unit 120 electrically converts a score corresponding to the area which the dart hits to transmit the converted score to the control module 190.

The speed measuring unit 125 may measure a speed of a dart pin during a predetermined interval or at a predetermined time in a period from a throwing time of the dart pin up to a reach time of the dart pin to a dart board. The dart game apparatus may measure the speed of the dart pin by using an optical sensor, a piezoelectric element, a camera and the like. Further, the speed of the dart pin may be measured by a method in which those skilled in the art may easily derive the speed of the dart pin in the art in addition to the optical sensor, the piezoelectric element, the camera, and the like. Hereinafter, the method in which the dart game apparatus measures the throwing speed of the dart pin will be described in more detail.

The dart game apparatus may measure the throwing speed of the dart pin by using the optical sensor. The speed may be measured with a time required for moving two predetermined points. The optical sensor senses whether the dart pin exists at two predetermined points on a throwing route of the dart pin. Data regarding a time when the optical sensor senses the existence of the dart pin may be transferred to the controller. A distance between two points where the optical sensor senses the throwing route of the dart pin may be previously set. The controller compares the time when the optical sensor senses the dart pin to acquire the time during which the dart pin moves between two points. When the distance between two points which the optical sensor senses is previously set, since the movement time and the distance between two points may be known, the dart game apparatus may calculate a movement speed of the dart pin.

Further, in the dart game apparatus, the optical sensor may sense the dart pin at one predetermined point on the throwing route of the dart pin and measure the speed of the dart pin by a method in which the dart board senses reaching of the dart pin.

In addition, the dart game apparatus may measure the throwing speed of the dart pin by using a piezoelectric element. A piezoelectric element is an element that generates an electric signal as a result of a transformation. The piezoelectric element may be positioned on the bottom of a segment of the dart target 110 and convert a pressure at which the segment of the dart board is pressed into an electric signal. The dart game apparatus may measure the speed of the dart pin by a pressure generated when the dart pin reaches the dart target 110. When the dart pin reaches the dart target 110, the piezoelectric element may generate the electric signal which is in proportion to an impact amount transferred by the dart pin. Accordingly, the strength of the electric signal generated by the piezoelectric element and the speed at which the dart pin reaches the dart target 110 are proportional to each other. The controller may measure the strength of the electric signal. Therefore, the controller 190 may calculate the speed of the dart pin at the measured strength of the electric signal by the proportional relationship between the measured strength of the electric signal and the speed of the dart pin. In this case, the dart game apparatus may previously receive information on a weight of the dart pin, and the like for speed definition accuracy.

Further, the dart game apparatus may measure the throwing speed of the dart pin by using a camera. A camera embedded in the dart game apparatus may photograph a movement route of the dart pin. The camera may photograph two or more specific points on the movement route of the dart pin. In addition, the controller 190 may know a location of the dart pin at a photographing time by analyzing the photographed image. The controller may know a movement distance of the dart pin by analyzing two or more photographed images. When the camera photographs two or more specific points on the movement route of the dart pin, an interval of the photographing time may be previously set. Therefore, the controller may know the movement distance of the dart pin at the previously set time interval. The controller may measure the throwing speed of the dart pin based on the previously set photographing time interval and the movement distance of the dart pin between the respective photographing times analyzed through the photographed image. The controller may calculate the movement distance of the dart pin during photographing based on the location of the dart pin at the time of photographing and calculate the movement speed of the dart pin based on the previously set photographing time interval.

The user input unit 130 receives an input of a user for controlling the dart game apparatus 100. The user input unit 130 may include a keypad, a dome switch, a touch pad (resistive/capacitive), a jog wheel, a jog switch, and the like. The user input unit 130 may also include cameras 151 to 153, a microphone, or the like.

The user input unit 130 may also include a short range communication module (not illustrated). The user input unit 130 may be configured to include the short range communication module (not illustrated) of the network connection unit 160. When the user input unit 130 includes the short range communication module of the network connection unit 160, the user input unit 130 may be configured to receive a user input which is input by an external console device. As short range communication technology, Bluetooth, radio frequency identification (RFID), infrared data association (IrDA), ultra wideband (UWB), ZigBee, or the like may be used.

For example, when the user input unit 130 performs the short range communication using infrared communication, the external console device may be an infrared remote controller. Alternatively, when the user input unit 130 performs the short range communication using a Bluetooth function, the external console device may be a mobile device including a Bluetooth module. The mobile device including the Bluetooth module may be, for example, a smart phone including a Bluetooth module.

The user may select a dart game mode, the number of dart game players, a dart game play mode, and the like through the user input unit 130. For example, the user may select the number of dart game players, the dart game play scheme (a zero one game, a cricket game, and the like), and the dart game mode (a single play, a network play, and the like) through the user input unit 130. Further, according to an embodiment of the present disclosure, the user may select a virtual dart game player through the user input unit 130.

The user input unit 130 receives a signal by sensing a key operation or a touch input of the user or receives speech or a motion through the cameras 151 to 153 or the microphone of the user to convert the received signal, speech, or motion into an input signal. To this end, a known speech recognition technology or a motion recognition technology may be used.

The output unit 140 which is used for generating an output related with sight, hearing, or touch may include a sound output unit 141, a display 142, an illumination unit 143, and the like.

The sound output module 141 may output audio data received from the communication module 160 or stored in the memory 180 in a game sound effect, a game motion guide, a game method description, and the like. The sound output module 141 may also output a sound signal related with a function (e.g., a game effect sound) performed by the dart game apparatus 100. The sound output module 141 may also output a speech of a game player or a third person using another dart game apparatus 200 (see FIG. 2), which is received through the communication module 160. The sound output module 141 may include a receiver, a speaker, a buzzer, and the like.

The display module 142 displays (outputs) information processed in the dart game apparatus 100. For example, when the dart game apparatus 100 is in a game play mode guidance mode, the display module 142 may output a selectable game play mode. When the dart game apparatus 100 is playing a game, the display module 142 may output an image acquired by photographing the game player or the third person using another dart game apparatus 200 (see FIG. 2) received through the network connection unit 160.

Further, the display module 142 may display an image of a dart-mobile game interworking mode according to the embodiment of the present disclosure. According to the embodiment of the present disclosure, the image may include a bonus zone of the dart target, a character image of the player, information on a character of the player, an image associated with a reward provided to the character of the player, an image based on game data in the dart-mobile game interworking mode, and an image associated with an event on a game which may be executed in the mobile terminal.

The display 142 may include at least one of a liquid crystal display (LCD), a thin film transistor-liquid crystal display (TFT LCD), an organic light-emitting diode (OLED), a flexible display, and a 3D display.

Some of the displays may be configured as a transparent or light transmissive type to view the outside through the displays. This may be called a transparent display and a representative example of the transparent display includes a transparent OLED (TOLED), and the like.

According to an implementation form of the dart game apparatus 100, two or more displays 142 may exist. For example, in the dart game apparatus 100, the plurality of displays may be separated from each other or integrally disposed on one surface, and further, disposed on different surfaces, respectively. For example, the display 142 may include both a display 142 disposed at an upper end of the dart target 110 and a display disposed at a lower end of the dart target 110, or may include one display 142 thereof. However, a location where the aforementioned displays are disposed is an example, and the display may be disposed at various locations for reasons due to design or visual effects.

The touch sensor may be configured to convert a change in pressure applied to a specific portion of the display 142 or capacitance generated at the specific portion of the display 142 into an electrical input signal. The touch sensor may be configured to detect touch pressure as well as a touched position and area.

When there is a touch input for the touch sensor, a signal(s) corresponding to the touch input is(are) sent to a touch controller. The touch controller processes the signal(s) and thereafter, transmits data corresponding thereto to the controller 190. As a result, the controller 190 may know which area of the display 142 is touched.

The illumination unit 143 outputs a signal for notifying occurrence of an event of the dart game apparatus 100. Examples of the event which occurs from the dart game apparatus 100 include identification of the dart game player, direct hit of the dart, a change of the dart game player, game over, and the like. The illumination unit 143 may include a light emission diode (LED) and notify the occurrence of the event to the user through flickering of the LED.

The LEDs are disposed on the bottom of the dart target 110 to be flickered according to a flickering pattern which is pre-stored according to the occurrence of the event. For example, one or more LEDs may be allocated to respective parts of the dart target 110. The allocated LEDs are disposed on the bottom of the dart target 110 and may be disposed in a direction orienting the outside of the dart game apparatus 100. When the LEDs irradiate light, the light irradiated by the LEDs may pass through the dart target 110 made of a transparent or translucent material to transfer a visual output to the user. Alternatively, the light irradiated by the LEDs may transfer the visual output to the user through a gap existing in the dart target 110.

The output unit 140 may also output another form other than a video signal or an audio signal, for example, a signal for notifying the occurrence of the event by vibration.

The camera unit 150 includes multiple cameras 151 to 153, and as a result, an image frame processed by the cameras 151 to 153 may be stored in the memory 180 or transmitted to the outside through the network connection unit 160. Two or more cameras 150 may be provided according to a use environment.

At least some cameras of the camera unit 150 may be disposed to photograph an image frame including the dart target 110 and other cameras may be disposed to photograph an image frame directly related with a game rule in the dart game play. For example, the camera may be disposed to photograph a throw-line on which the dart is thrown in order to photograph the image frame directly related with the dart game rule. The multiple cameras 151 to 153 included in the camera unit 150 may be disposed to photograph at least some image frames to overlap with each other.

When the camera unit 150 includes one camera, the camera may be a panoramic camera disposed to photograph both at least a part of the dart target 110 and the image frame (e.g., the throw-line in the dart game) directly related with the game rule.

The network connection unit 160 may include one or more modules that enable wireless communication between the dart game apparatus 100 and a wired/wireless communication system or between the dart game apparatus 100 and a network on which a dart game apparatus (not illustrated) is positioned.

Further, the network connection unit 160 may connect the dart game apparatus 100 and at least one of the dart server 200, the mobile game server 300, and the mobile terminal 400 through a wired/wireless communication system.

In addition, the network connection unit 160 may transmit data associated with the reward to at least one of the dart game server, the mobile game server, and the mobile terminal according to the embodiment of the present disclosure. The reward may include the reward for the game executed on the mobile terminal.

Further, the network connection unit 160 may receive game data of the dart-mobile game interworking mode from at least one of the dart game server, the mobile game server, and the mobile terminal according to another embodiment of the present disclosure. The game data may include event data on the game which may be executed in the mobile terminal.

In addition, the network connection unit 160 may transmit data regarding the character to which the reward is provided to at least one of the dart game server, the mobile game server, and the mobile terminal. The reward may include a game item, a coin for the game, an experience value of the character, and a reward for the game, which may be used for changing the character and the growth of the character.

The network connection unit 160 may include a wired/wireless Internet module for accessing the network. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, digital subscriber line (XDSL), fibers to the home (FTTH), power line communication (PLC), or the like may be used.

Further, the network connection unit 160 includes a short-range communication module to transmit and receive data to and from an electronic apparatus positioned in a comparatively short range from the dart game apparatus 100 and including the short-range communication module. As short range communication technology, Bluetooth, radio frequency identification (RFID), infrared data association (IrDA), ultra wideband (UWB), ZigBee, or the like may be used.

The network connection unit 160 may sense a connection state of the network and a transceiving speed of the network.

Data received through the network connection unit 160 may be output through the output unit 140, stored through the memory 180, or transmitted to other electronic apparatuses positioned in a short range through the short-range communication module.

The user recognition unit 170 recognizes unique information of a long-range user by using a radio wave through the radio frequency identification (RFID) technology which is a kind of the short range communication technology. For example, the user may possess a card, a mobile terminal, or unique dart game equipment, for example, his/her own personal dart equipment, which includes an RFID module. Information (e.g., a personal ID, an identification code, and the like of the user registered in a user identification information DB 259) for identifying the user may be recorded in the RFID module possessed by the user. The dart game apparatus 100 may identify the RFID module possessed by the user to identify a dart game player who plays the game by using the dart game apparatus 100 and update a database for the identified dart game player or accumulate new data.

The user recognition unit 170 may include various technologies (e.g., the short-range communication technology such as the Bluetooth, and the like) that may transmit and receive unique information of the user by a contact/non-contact method in addition to the RFID technology. Further, the user recognition unit 170 may include a biodata identification module that identifies biodata (speech, a fingerprint, and a face) of the user by interworking with the microphone of the user input unit 130, the touch pad, the camera unit 150, and the like.

Further, according to the embodiment of the present disclosure, the user recognition unit 170 may recognize the player based on at least one of an e-mail account of the player, a social network service (SNS) account of the player, a mobile messenger account of the player, an ID of the player, and identification information of the player. In addition, the controller 190 may identify the mobile terminal, the mobile game account, and the character of the player to which the reward will be provided based on the recognition result.

The memory 180 may store a program for a motion of the controller 190 therein and temporarily store input/output data (e.g., a phone book, a message, a still image, a moving picture, or the like) therein. The memory 180 may store data regarding various patterns of vibrations and sounds output in the touch input on the touch screen.

The memory 180 may include at least one type storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The dart game apparatus 100 may operate in connection with a web storage performing a storing function of the memory 180 on the Internet.

The controller 190 generally controls all motions of the dart game apparatus 100. For example, in the case of the dart game, it may be determined that scores sensed through the sensing unit 120 will be aggregated for each game participant, information on the player will be recognized, and the reward will be provided to the player at least partially based on dart game execution data of the player. More detailed description will be made below.

Further, according to another embodiment of the present disclosure, the controller 190 may determine to provide the reward to the player at least partially based on dart-mobile game interworking mode execution data of the player. More detailed description will be made below.

Further, according to another embodiment of the present disclosure, the controller 190 may determine to recognize the information on the player, create or load the character of the player, and provide the reward to the character at least partially based on the dart game execution data of the player. More detailed description will be made below.

The controller may perform pattern recognition processing to recognize a motion input, a write input, and the like performed on the touch screen or camera as a text or an image. Further, the controller may perform speech recognition by using a speech-to-text (STT) function to recognize the speech input through the microphone as text.

Various embodiments described herein may be implemented in a computer-readable recording medium or a recording medium readable by a device similar to a computer by using, for example, software, hardware, or a combination thereof.

In terms of hardware implementation, the embodiment described herein may be implemented by using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and electric units for performing other functions. In some cases, the embodiments described in the specification may be implemented by the controller 190 itself.

According to software implementation, embodiments such as a procedure and a function described in the specification may be implemented by separate software modules. Each of the software modules may perform one or more functions and operations described in the specification. A software code may be implemented by a software application written in an appropriate program language. The software code may be stored in the memory 180 and executed by the controller 190.

Figure 2:
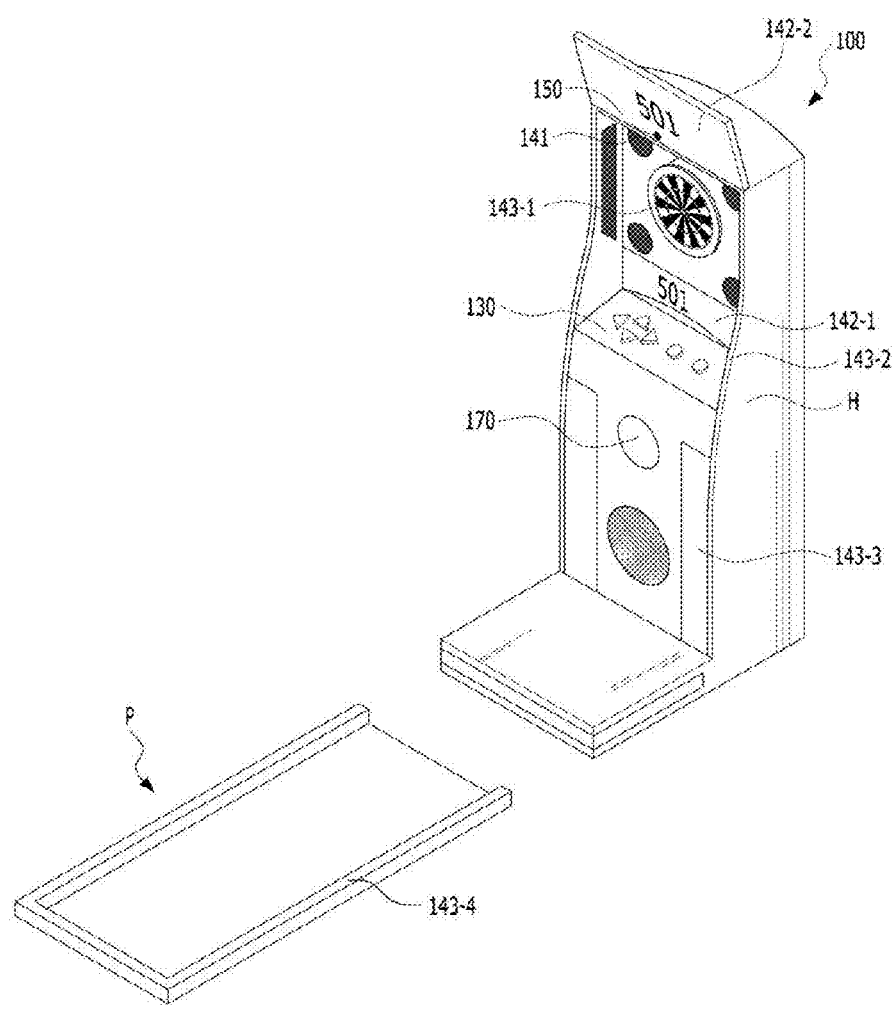
FIG. 2 is a perspective view of the dart game apparatus according to the embodiment of the present disclosure.

FIG. 2 is a perspective view of the dart game apparatus according to the embodiment of the present disclosure.

As illustrated in FIG. 2, the dart game apparatus 100 according to the embodiment of the present disclosure may be formed by mounting the components illustrated in FIG. 1 in a housing H. A dart target 110, a display 142, an illumination unit 143, a sound output unit 141, a camera unit 150, and a user recognition unit 170 may be disposed on the front surface of the dart game apparatus 100.

The dart target 110 may be disposed so that a dead center is positioned at a position (for example, 5 feet 8 inches in a vertical direction from the ground) which conforms with a rule of the dart game. The illumination units 143-1, 143-2, and 143-3 may be disposed at various parts of the dart game apparatus 100 to transfer a visual effect to the player of the dart game apparatus 100.

For example, the illumination unit 143-1 is disposed at the side of the dart target 110 and may serve to irradiate an illumination to the dart target 110. The illumination unit 143-1 may also output a predetermined illumination effect according to an event of the dart game. Further, the illumination unit 143-1 may output illumination effects having various colors.

The illumination unit 143-2 may be formed to be extended in a vertical direction along a forward projection of the housing H. Like the illumination unit 143-1, the illumination unit 143-2 may output a predetermined illumination effect according to an event of the dart game and output illumination effects having various colors.

The illumination unit 143-3 may be disposed on the side of the user recognition unit 170. The illumination unit 143-3 may output a predetermined illumination effect according to an event of the dart game and output illumination effects having various colors. Particularly, the illumination unit 143-3 may output an illumination effect for an event related with the user recognition unit 170.

Selectively, the dart game apparatus 100 may include a dart plate P which may be selectively connected with the dart game apparatus 100 and is extended in a horizontal direction. The dart plate P may further include an illumination unit 143-4. The dart plate P may be integrally coupled with or selectively attached to or detached from the dart game apparatus 100.

When the dart plate P is integrally coupled with or selectively attached to the dart game apparatus 100, the dart plate P may be electrically connected with the dart game apparatus 100. The illumination unit 143-4 of the dart game apparatus 100 may be disposed along the outside of the dart plate P as illustrated in FIG. 2. One end of the dart plate P may be extended to a place where a throw-line is to be positioned according to a distance of the throw-line from the dart target according to a rule of the game. The illumination unit 143-4 may be disposed at a position corresponding to the throw-line.

Although not illustrated in FIG. 2, an illumination unit (not illustrated) is disposed at the bottom of the dart target 110 to irradiate an illumination effect in a user direction. The illumination unit (not illustrated) may include a combination of different illumination elements allocated according to each segment configuring the dart target.

The housing H of the dart game apparatus 100 may include the display 142 disposed in the user direction. The display 142 may display information (for example, a collected score, information on a player who is playing the game, a score required for clearing the corresponding game, information of an opposite player who does not play the game, the bonus zone of the dart target, the provided reward, a play image of the dart-mobile game interworking mode, and the like) required for the user according to the progress of the dart game. The display 142 may display a visual effect according to an event depending on the progress of the dart game. For example, when the user continuously hits a bullseye at the dead center of the dart target 110 with three dart throw chances, the display 142 may display a pre-stored motion picture corresponding to the corresponding event. The motion picture may be stored in the memory 180 of the dart game apparatus 100 or received from a server through the network connection unit 160.

The display 142 may provide the user with visual and audible effects according to occurrence of the event by interlocking with the illumination units 143-1, 143-2, 143-3, and 143-4 and the sound output unit 140. In other words, when a predetermined event occurs, the display 142, the illumination units 143-1, 143-2, 143-3, and 143-4, and the sound output unit 140 may output an illumination effect, a display effect, and a sound effect with respect to the corresponding event together.

In FIG. 2, it is illustrated that the displays 142 are disposed at the lower end and the upper end of the dart target 110, but the number and disposed positions of displays 142 may be variously modified. In an embodiment of the present disclosure, the display module 142 may include a plurality of monitors 142-1, 142-2, and 142-3.

The user input unit 130 may be configured in a key pad button form as illustrated in FIG. 2. However, as described above, the user input unit 130 may be configured by various types including a touch screen. The user operates a key button of the user input unit 130 to select a mode of a game to be played by the user, a virtual dart game player to be played as a team, and the like.

The sound output unit 141 is also disposed on the front surface of the housing H of the dart game apparatus 100 to output a sound. The number and disposed positions of sound output units 141 may also be variously modified.

The camera unit 150 may be mounted on the top of the housing H of the dart game apparatus 100 as illustrated in FIG. 2. The camera unit 150 may include one or more cameras 151 to 153 which may photograph the dart target 110 and the throw line. The image photographed through the camera unit 150 may be transferred to the memory 180. In some embodiments, only some of the motion pictures photographed by the camera unit 150 may be finally stored in the memory 180 or transferred to a server (not illustrated) through the network connection unit 160.

The user recognition unit 170 may be disposed on the front surface of the housing H of the dart game apparatus 100 and include a short range communication module as illustrated in FIG. 2. The user touches a card for recognizing the user near the user recognition unit 170 to complete user authentication.

Further, according to the embodiment of the present disclosure, the user recognition unit 170 may authenticate the player based on at least one of the e-mail account of the player, the social network service (SNS) account of the player, the mobile messenger account of the player, the ID of the player, and identification information of the player. In this case, the user recognition unit 170 may authenticate the user by receiving the information through the user input unit 130.

The contents illustrated in FIG. 2 and the description of the exterior of the aforementioned dart game apparatus 100 are just an example proposed for description, and the dart game apparatus 100 according to the present disclosure is not limited by the exterior illustrated in FIG. 2.

Figure 3:
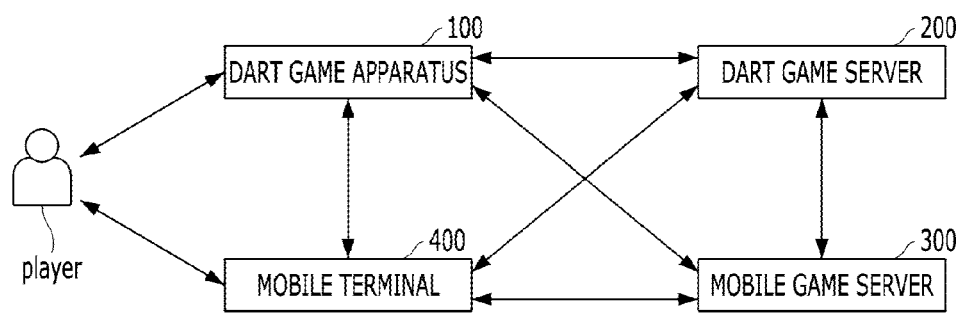
FIG. 3 is a conceptual view of a dart game network including the dart game apparatus, a mobile terminal, a dart server, and a mobile game server according to the embodiment of the present disclosure.

FIG. 3 is a conceptual view of a dart game network including the dart game apparatus, a mobile terminal, a dart server, and a mobile game server according to the embodiment of the present disclosure.

The network connection unit 160 may connect the dart game apparatus 100 and at least one of the dart server 200, the mobile game server 300, and the mobile terminal 400 through the wired/wireless communication system.

The dart game player may play the dart game mode interworked with the game (hereinafter, referred to as the mobile game) implemented in the mobile terminal by using the dart game apparatus 100. The dart game mode interworked with the mobile game may include a game mode to provide the reward for the mobile game at least partially based on the dart game execution data depending on a dart game execution result in the dart game apparatus, a game mode to perform specific events (for example, a battle with a boss monster and a match-up between users) which may be performed on the mobile game in the dart game apparatus, a game mode to grow up according to the game execution result by performing the dart game in the dart game apparatus, and the like.

According to the embodiment of the present disclosure, the dart game apparatus 100 may determine providing the reward to the player at least partially based on the dart game execution data including the dart game execution result of the player and transmit data associated with the reward to at least one of the dart game server 200, the mobile game server 300, and the mobile terminal 400. The player of the dart game apparatus and the player of the mobile game may be the same as each other and whether both players are the same as each other may be determined based on the information on the player. The information on the player may include at least one information of the e-mail account of the player, the SNS account of the player, the mobile messenger account of the player, the ID of the player, and the information to identify the player.

The dart game server 200 may store the data associated with the reward received from the dart game apparatus 100, transmit the data to the mobile game server 300, or transmit the data to the mobile terminal 400. The player of the dart game apparatus may verify the reward for the mobile game depending on the dart game execution result in the mobile terminal 400 through the aforementioned process. Therefore, the player of the mobile game may be introduced into the dart game player through a cross promotion (a scheme in which both games advertise the games to players thereof by providing the reward in game A when a user of specific game A between two or more different games plays game B) between the dart game and the mobile game and an opposite case to the case is also available to increase the number of players of the dart game.

Further, the dart game server 200 may transmit the information regarding the character of the player to the dart game apparatus 100. The character of the player may mean the character of the player of the dart game apparatus 100. Therefore, the player of the dart game apparatus 100 plays the dart game to grow the character thereof and use the character in the mobile game.

Further, the game data of the dart-mobile game interworking mode according to the embodiment of the present disclosure may be transmitted to the dart game apparatus 100 from at least one of the mobile terminal 400, the mobile game server 300, and the dart game server 200. The dart-mobile game interworking mode may be a game mode to perform the event on the game which may be executed in the mobile terminal in a dart game pattern at least partially based on the game data. Further, the data associated with the reward determined to be provided to the player at least partially based on the execution data of the dart-mobile game interworking mode may be transmitted to the dart game server 200, the mobile game server 300, or the mobile terminal 400 from the dart game apparatus 100.

The dart game server 200 is combined with the mobile game server 300 to be implemented as one server or implemented as different respective servers. An operation (for example, an operation of transmitting the data associated with the reward, and the like) associated with the mobile game among operations performed by the dart game server 200 may be performed by the mobile game server 300.

The dart game server 200 may store the data associated with the game mode interworked with the mobile game and also store the data associated with the dart game. The data associated with the dart game may include victory or defeat of the dart game, the score of each dart game player, and the like.

The dart game apparatus 100, the dart game server 200, the mobile game server 300, and the mobile terminal 400 may include a communication means apparent to those skilled in the art for mutual communication.

Figure 4:
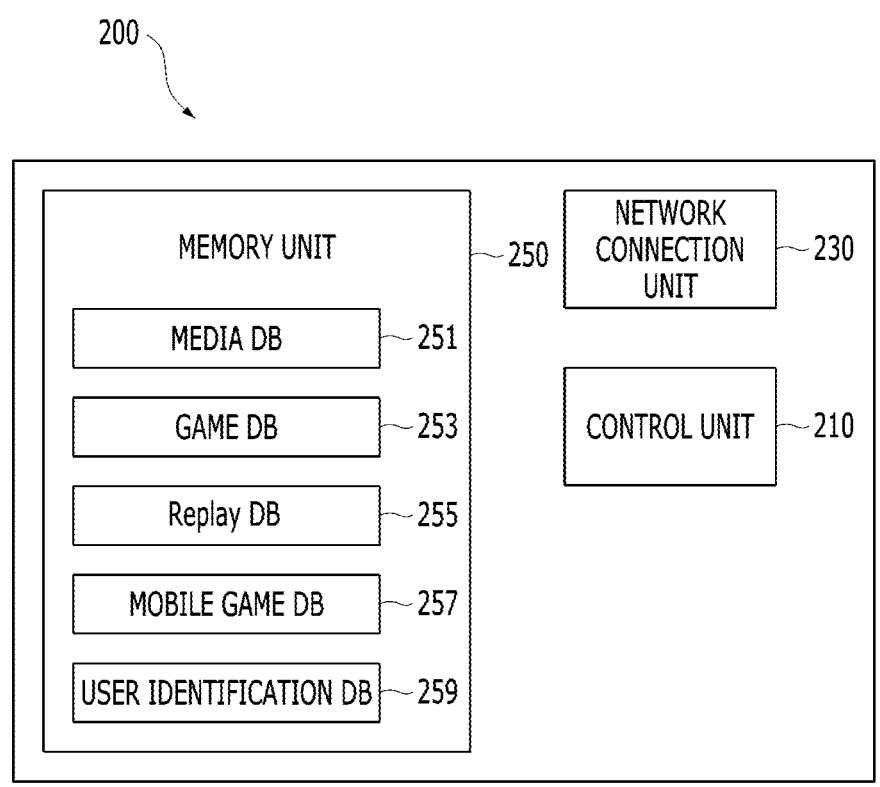
FIG. 4 is a block diagram of the dart server according to the embodiment of the present disclosure.

FIG. 4 is a block diagram of the dart server according to the embodiment of the present disclosure.

The dart game server 200 may include a control unit 210 of a server, a network connection unit 230 of the server, and a memory unit 250. The components illustrated in FIG. 4 are not essential components. Therefore, a server having more components than or less components than those illustrated in FIG. 4 may be implemented.

Hereinafter, the components will be described in sequence.

The control unit 210 generally controls all motions of the dart game server 200. For example, a detailed reward may be determined by receiving the data associated with the reward from the dart game apparatus 100. Further, the detailed reward is determined by the dart game apparatus 100 and the dart game server 200 may receive the data associated with the reward and transmit the received data to the mobile game server 300 or the mobile terminal 400.

The network connection unit 230 may include the communication means apparent to those skilled in the art for connection with the dart game apparatus 100, the mobile game server 300, and the mobile terminal 400 through the wired/wireless communication network.

The memory unit 250 may store all data associated with the dart game. The memory unit 250 may include a media DB 251, a game DB 253, a replay DB 255, a mobile game DB 257, and a user identification information DB 259.

The memory unit 250 may include at least one storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The media DB 251 may store the illumination effect, the sound effect, and the like which may be generated by the dart game apparatus 100. Further, the media DB 251 may store a dart game image which may be played in the dart game apparatus 100. The dart game image may include an image associated with the visual effect which may be provided to the dart game player in the dart game apparatus 100. The dart game image may be displayed by the display module 142 of the dart game apparatus 100.

The game DB 253 may store the data game execution data. The dart game execution data may include data associated with a result acquired when the player executes the dart game. According to the embodiment of the present disclosure, the dart game execution data may be data at least partially based on at least one information of the number of dart game execution times of the player, information on a dart game winning rate of the player, dart game accuracy rate information of the dart game of the player, throwing speed information of the dart pin of the player, dart game score information of the player, and ranking information of the player.

The accuracy rate information of the player may be an accuracy rate for a high-score dart score area (for example, a double bull region and a triple ring region) in the case of a casual dart (for example, a count-up game) to just contend the total sum of scores. Further, in games including a 01 game, a cricket game, and the like, the accuracy rate information may mean accuracy rate for an appropriate dart score area according to each situation (for example, means an appropriate dart game area for making scores ending with 01 as an end figure, such as 101, 201, and the like as a winning condition in a current score situation in the case of the 01 game. That is, to say, a triple ring area (51 points are granted at the time of accurate hitting) of 17 points may be the appropriate score area according to each situation when a current score is 50 points).

The replay DB 255 may store the image photographed by the camera unit 150. The camera unit 150 may photograph a dart game play image of the player by using one or more cameras. The photographed image may include an image for determining whether the dart game is rightfully played. The photographed image may include an image acquired by photographing a throwing line so that the player knows whether the dart pin is thrown over the throwing line and an image acquired by photographing the dart target in order to sense that the dart pin is accurately hit and sense whether an unjustifiable input (for example, an unjustifiable action for the player to press the dart target with a hand) is input in the dart target.

The mobile game DB 257 may store all data associated with the mobile game. The data associated with the mobile game may include a list of the mobile game which may operate by interworking with the dart game apparatus 100, the data associated with the reward which may be used in the mobile game provided according to the dart game execution result in the dart game apparatus 100, the data associated with the character of the player of the dart game apparatus 100, the data associated with the reward to be provided to the character of the player, the data associated with the character of the player to which the reward is provided, the game data of the dart-mobile game interworking mode, and the like.

The game data of the dart-mobile game interworking mode may include the event data on the mobile game. For example, the game data of the dart-mobile game interworking mode may become the event data including the battle with the boss monster on the mobile game, the match-up between the players of the mobile game, and the like. The dart-mobile game interworking mode may be a game mode to perform the event on the mobile game by the dart game method in the dart game apparatus 100.

The user identification information DB 259 may include information to recognize the player according to the embodiment of the present disclosure. According to the embodiment of the present disclosure, the user identification information DB 259 may store information to determine whether the player of the dart game apparatus 100 is the same as the mobile game player when a specific mobile game player performs the dart game through the dart game apparatus 100. According to the embodiment of the present disclosure, the information of the player stored in the user identification information DB 259 may include the identification information of the player, which includes the e-mail account of the player, the SNS account of the player, the mobile messenger account of the player, the ID of the player, and the like.

Figure 5:
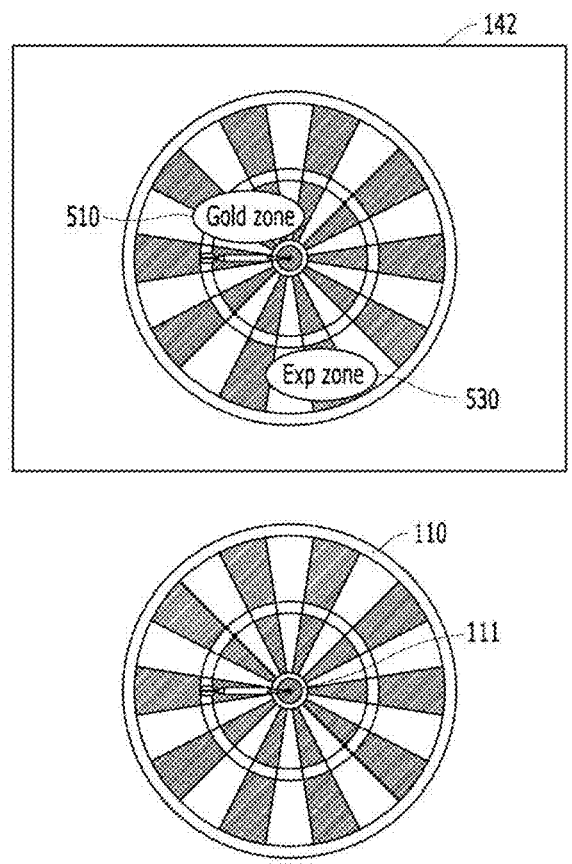
FIG. 5 illustrates a dart target and a bonus zone of the dart target according to the embodiment of the present disclosure.

FIG. 5 illustrates a dart target and a bonus zone of the dart target according to the embodiment of the present disclosure.

The dart target 110 according to the embodiment of the present disclosure may have bonus zones 510 and 530. According to the embodiment of the present disclosure, the dart game apparatus 100 may provide the reward which may be used in the mobile game to the player at least partially based on the dart game execution result of the player.

The reward according to the embodiment of the present disclosure may include at least one of a charged billing item, the game item, the coin for the game, the character, the experience value of the character, and an item required for the progress of the game used on the game executed on the mobile terminal. The charged billing item may mean an item provided by a charge in a partial charging game. In general the charged billing item may include an item having a better capability value than the item which may be acquired in the game. Further, the charged billing item may include an item to characteristically change an appearance of the character. The charged billing item may include an item which may not be acquired only by the play of the game and may be particularly acquired only through charged payment. The item required for the progress of the game may include a ticket, jewelry, and the like required for playing the game. For example, in general, in the case of the mobile game, a ticket for playing the game, and the like may be provided and the predetermined number of the tickets may be charged when a predetermined time (for example, 10 minutes) elapsed (for example, up to 10 tickets may be charged as a time elapsed). The ticket may be provided when a promotion of the game using the mobile messenger, and the like are performed (for example, in the case of a game associated with KakaoTalk, when a message for inviting the game is transmitted to a user which is a friend of the corresponding user through KakaoTalk, the ticket and the like may be provided).

According to the embodiment of the present disclosure, the player of the dart game apparatus 100 may receive the reward which may be used in the mobile game at least partially based on the dart game execution result. In the dart game apparatus 100, the bonus zones 510 and 530 may be included in the dart target 110 in order to provide the reward which may be used in the mobile game. When the player accurately hits the dart on the bonus zones 510 and 530 of the dart target 110, a bonus reward may be provided in addition to the reward which may be used in the mobile game provided to the player. For example, when the player accurately hits the dart on a location corresponding to a gold zone 510 displayed in the display module 142 of the dart game apparatus 100 in the dart target 110, the coin for the game may be further provided as a bonus in addition to the reward which may be used on the mobile game, which will be provided to the player. Further, for example, when the player accurately hits the dart on a location corresponding to an experience zone 530 displayed in the display module 142 of the dart game apparatus 100 in the dart target 110, the experience value of the mobile game character may be further provided as the bonus in addition to the reward which may be used on the mobile game, which will be provided to the player. The location of the bonus zone and contents of the bonus are just an example and various bonus effects may be granted with respect to various locations of the dart target 110. The bonus zone may be expressed through the display module 142 and further, may be directly displayed in the dart target 110 by using a separate projection device (not illustrated).

Figure 6:
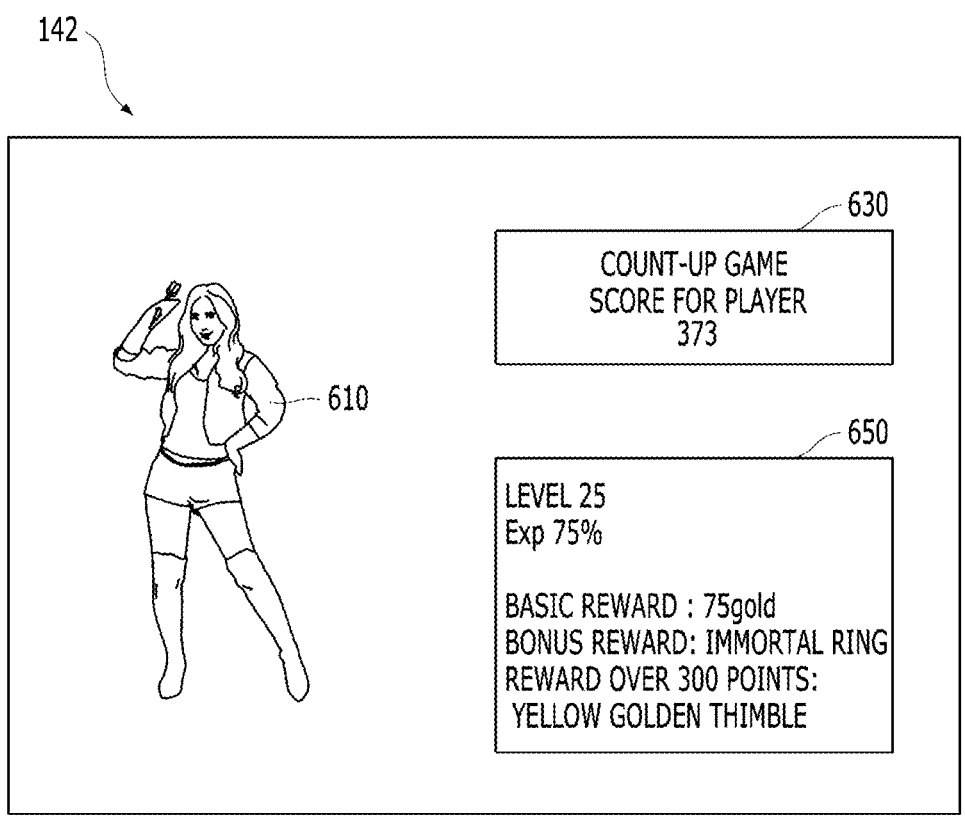
FIG. 6 illustrates an example of providing a reward according to the embodiment of the present disclosure.

FIG. 6 illustrates an example of providing a reward according to the embodiment of the present disclosure.

According to the embodiment of the present disclosure, the dart game apparatus 100 may recognize the information on the player, create or load the character of the player, determine providing the reward to the character at least partially based on the dart game execution data of the player, and further, transmit data on the character to which the reward is provided to at least one of the dart game server, the mobile game server, and the mobile terminal.

FIG. 6 illustrates one example of displaying a character 610 of the player, a dart game execution result 630 of the player, and a reward 650 provided to the character to the display module 142 of the dart game apparatus 100.

According to the embodiment of the present disclosure, the player of the dart game apparatus 100 may have the character 610 thereof and the character may be stored in at least one of the dart game apparatus 100, the dart game server 200, the mobile game server 300, and the mobile terminal 400. In the aforementioned example, the player of the dart game apparatus 100 performs the count-up game and the score of the player is 373 points (630). In this case, the dart game apparatus 100 may determine providing the reward 650 to the character of the player at least partially based on the dart game execution result of the player. A level of the character 610 of the player is 25 and an experience value is progressed at approximately 75% (when the experience value of approximately 25% is further acquired, the level is leveled up to level 26) and the player performs the count-up game through the dart game apparatus 100, and as a result, the character 610 receives 75 gold as a basic reward. In this case, the player may rear the character through the dart game apparatus 100. Since the player acquires a score of 300 or more as a result of performing the count-up game with the dart game apparatus 100, the player additionally acquires a "yellow golden thimble" item. Further, the player acquires an "immortal ring" item as the bonus, such as accurately hitting the bonus zone, or the like as described with reference to FIG. 5. The display module 142 may display the dart game execution result 630, the character 610 of the player, and the reward information 650 to be provided to the character of the player according to the dart game execution result. According to the embodiment of the present disclosure, the reward to be provided to the character may include the game item (for example, the golden thimble), the coin (for example, 75 gold) on the game, the experience value of the character, and the reward for the game, which may be used for changing the character and the growth of the character. According to the embodiment of the present disclosure, the character 610 of the player to which the reward is provided may be used in the mobile game. The dart game execution result and the reward provided to the character 610 at least partially based on the dart game execution result are just an example and various rewards may be provided to the character 610 of the player at least partially based on the dart game execution result.

Figure 7:
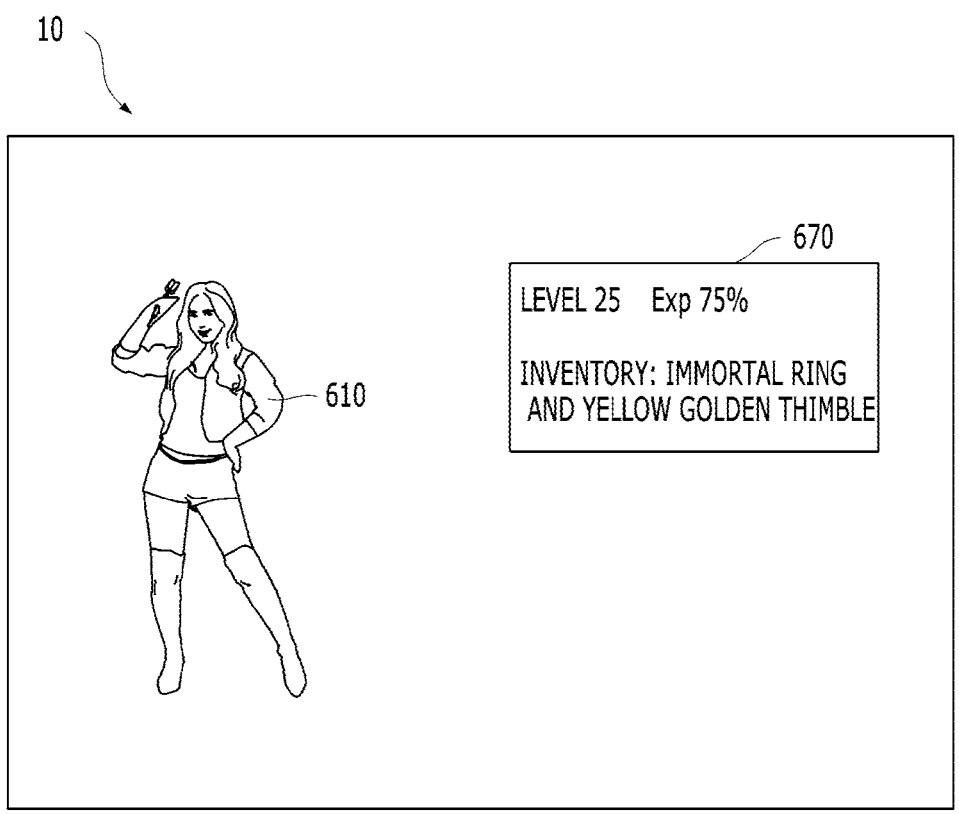
FIG. 7 illustrates an example of verifying the reward in the mobile terminal according to the embodiment of the present disclosure.

FIG. 7 illustrates an example of verifying the reward in the mobile terminal according to the embodiment of the present disclosure.

According to the embodiment of the present disclosure, the player of the dart game apparatus 100 may have the character 610 thereof and the character may be stored in at least one of the dart game apparatus 100, the dart game server 200, the mobile game server 300, and the mobile terminal 400.

According to the embodiment of the present disclosure, the character 610 of the player may be used in the mobile game. According to the embodiment of the present disclosure, the character 610 of the player may be used in the mobile game or used even through the dart game apparatus 100. The player may perform the mobile game by using the character 610 of the player in the mobile game. On the mobile game (for example, MMOPRG, and the like), the character 610 of the player may acquire the reward which may be used in the mobile game through the mobile game play of the player. Further, according to the embodiment of the present disclosure, the player performs the dart game interworked with the mobile game through the dart game apparatus 100 to acquire the reward to be provided to the character 610. The character 610 to which the reward is provided may be stored in at least one of the dart game server 200, the mobile game server 300, and the mobile terminal 400 in the dart game apparatus 100.

According to the embodiment of the present disclosure, the character 610 on the mobile game may play the dart game scheme in the dart game apparatus 100 and the dart game apparatus may provide the reward to the character 610 at least partially based on the dart game play result. The character 610 to which the reward is provided may be used in the mobile terminal 400. In this case, in the mobile terminal 400, the reward 670 (the immortal ring and the yellow golden thimble) provided to the character 610 may be verified.

When the embodiment of the present disclosure is summarized, the player creates the character 610 of the player or loads the stored character in the dart game apparatus 100 and plays the dart game to grow the character and the grown character may be played in the mobile game. The reward provided to the character 610 is just an example and various rewards which may be provided to the mobile game character may be provided.

Figure 8:
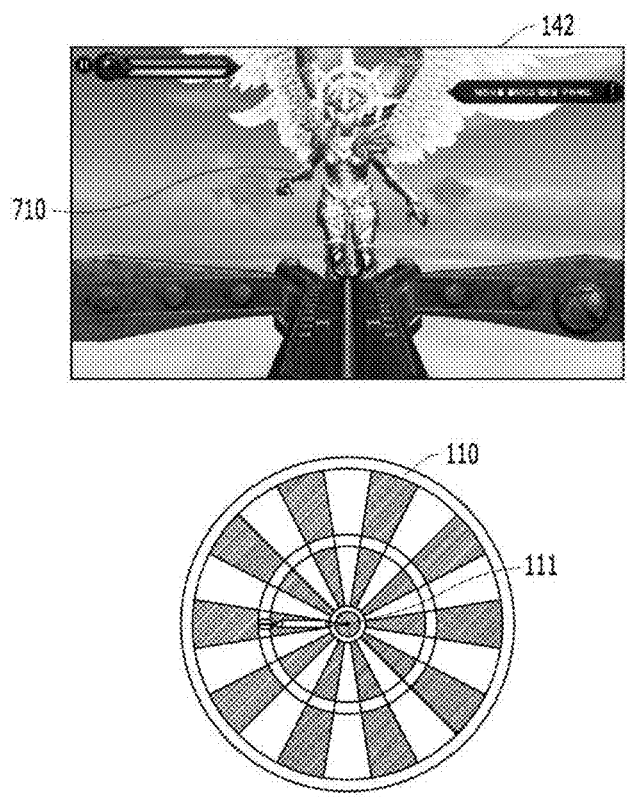
FIG. 8 illustrates an example of a play in a dart-mobile game interworking mode according to another embodiment of the present disclosure.

FIG. 8 illustrates an example of a play in a dart-mobile game interworking mode according to another embodiment of the present disclosure.

According to the embodiment of the present disclosure, the dart game apparatus 100 may receive game data in a dart-mobile game interworking mode from at least one of a dart game server 200, a mobile game server 300, and a mobile terminal 400 and determine providing the reward to the player at least partially based on the dart-mobile game interworking mode execution data of the player. The game data may include event data on the mobile game. The dart-mobile game interworking mode may include a game mode to perform an event (for example, a battle with boss monsters, a match-up between players) on the game which may be executed in the mobile terminal in a dart game pattern at least partially based on the game data. Further, in this case, a provided reward may be a higher reward than the reward when the event on the mobile game is performed on the mobile terminal.

According to the embodiment of the present disclosure, the display module 142 may display an event on the game which may be executed on the mobile terminal at least partially based on the game data in the dart-mobile game interworking mode. The event may include for example, a battle with a boss monster and a match-up between players, and the like. As illustrated in FIG. 8, the display module 142 may display a boss monster 710. In this case, the player may perform the battle with the boss monster 710 by a dart game method.

The dart game apparatus 100 may handle the event on the mobile game to be clear in the case where the player performs the dart-mobile game interworking mode by a dart game method and achieves a specific winning condition in the dart game. For example, the player of the mobile game may perform a battle with the boss monster in the mobile game by the dart game method in the dart game apparatus 100 by using the dart-mobile game interworking mode. In this case, the dart game apparatus 100 may determine that the player wins in the battle with the boss monster in the case of achieving the winning condition (for example, 300 scores or more) in the dart game (for example, a count-up game). The dart game apparatus 100 may provide a reward to the player at least partially based on the dart-mobile game interworking mode execution data. In this case, the reward may include a reward which may be used on the mobile game. In this case, the reward may be a higher reward (for example, providing 150 gold when the battle with the boss monster is performed through the dart-mobile game interworking mode) than a case (for example, providing 100 gold as the reward in this case) when the player executes the mobile game event (for example, a battle with a boss monster) on the mobile terminal. The event on the mobile game is just an example, and various events which may be executed on the mobile game may be executed in the dart game apparatus 100 through the dart-mobile game interworking mode. The aforementioned reward is just exemplified, and the dart game apparatus may generally provide a higher reward when the event is executed through the dart-mobile game interworking mode than when the event on the mobile game is executed on the mobile terminal.

Figure 9:
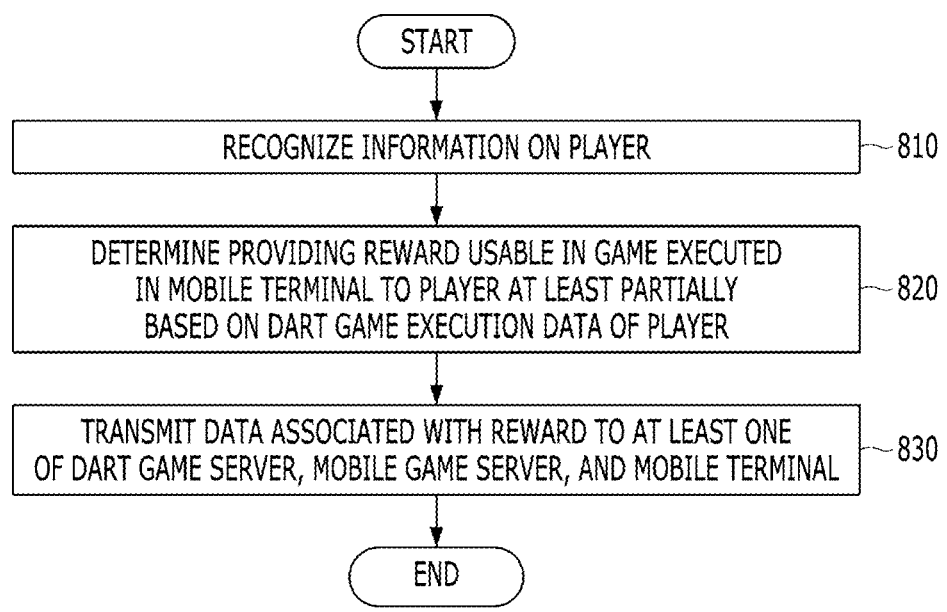
FIG. 9 is a flowchart for providing a dart game mode interworked with a mobile game according to an embodiment of the present disclosure.

FIG. 9 is a flowchart for providing a dart game mode interworked with a mobile game according to an embodiment of the present disclosure.

The dart game apparatus may recognize player information (810). The player information may be based on at least one of an e-mail account of the player, a social network service (SNS) account, a mobile messenger account, an identification (ID) of the player, and identification information of the player. The dart game apparatus 100 may specify the player through the player information.

The player may play the dart game through the dart game apparatus 100. The dart game apparatus 100 may determine providing a reward which may be used on the game executed on the mobile terminal for the player at least partially based on the data game execution data of the player (820). The dart game execution data of the player may be at least partially based on at least one of information on the number of dart game execution times of the player, information on a dart game winning rate of the player, information on dart game accuracy rate of the dart game of the player, information on throwing speed of the dart pin of the player, information on dart game score of the player, and information on ranking of the player. The reward which may be used on the game executed on the mobile terminal may include at least one of a paid charging item, a game item, a coin for the game, a character, an experience value of the character, and an item required for the game progress, which are used on the game executed on the mobile terminal. For example, the throwing speed of the dart pin of the player is measured and higher money on the mobile game may be provided as the measurement speed is increased based thereon. The aforementioned dart game execution data and the reward therefor are just exemplified, and various rewards may be provided based on the dart game execution result of the player.

The dart game apparatus 100 may transmit data related with the reward to at least one of the dart game server 200, the mobile game server 300, and the mobile terminal 400 (830). The data related with the reward is transmitted to the dart game server 200, the mobile game server 300, and the mobile terminal 400, and thus the player may execute the mobile game by receiving the reward for the mobile game. The player may obtain a reward including items which may be used on the mobile game and the like by playing the dart game apparatus 100.

Figure 10:
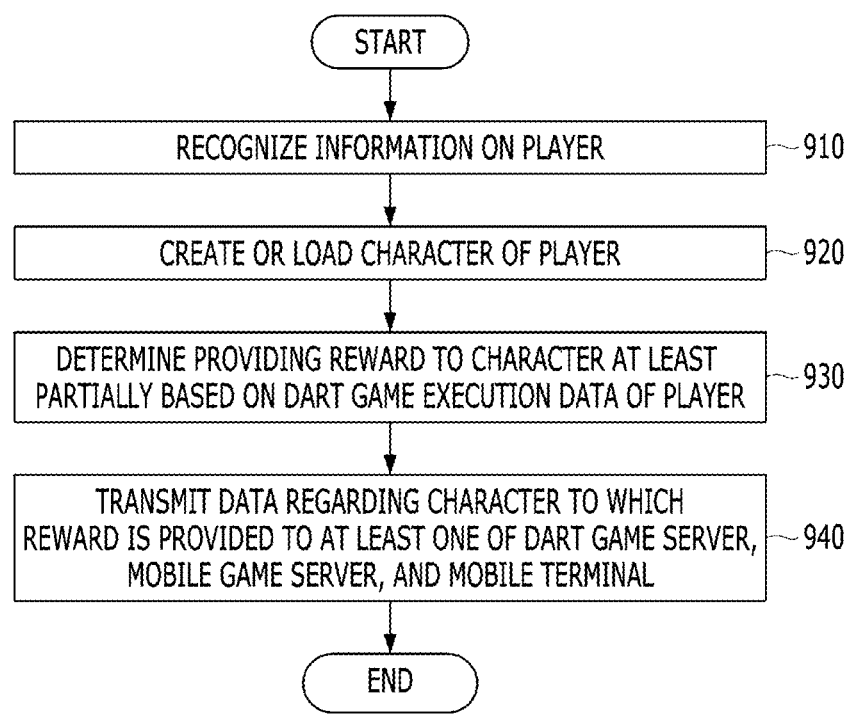
FIG. 10 is a flowchart for providing a dart game mode interworked with a mobile game according to another embodiment of the present disclosure.

FIG. 10 is a flowchart for providing a dart game mode interworked with a mobile game according to another embodiment of the present disclosure.

The dart game apparatus 100 may recognize player information (910). The player information may be based on at least one of an e-mail account of the player, a social network service (SNS) account, a mobile messenger account, an identification (ID) of the player, and identification information of the player. The dart game apparatus 100 may specify the player through the player information.

The dart game apparatus 100 may generate or load a character of the player. The character may be a character on the mobile game. For example, the character may be a character on an MMORPG game executed on the mobile terminal. The character may be stored in at least one of the dart game apparatus 100, the dart game server 200, the mobile game server 300, and the mobile terminal 400. The aforementioned character is just exemplified and may include a character which may be used on various games.

The dart game apparatus 100 may determine providing a reward to the character at least partially based on the dart game execution data of the player. The dart game execution data of the player may be at least partially based on at least one of information on the number of dart game execution times of the player, information on a dart game winning rate of the player, information on dart game accuracy rate of the dart game of the player, information on throwing speed of the dart pin of the player, information on a dart game score of the player, and information on ranking of the player. The reward to be provided to the character may include a game item, a coin for the game, an experience value of the character, and a reward for the game, which may be used for changing the character and the growth of the character. For example, the throwing speed of the dart pin of the player is measured and higher coin for the mobile game may be provided as the measurement speed is increased based thereon. The aforementioned dart game execution data and the reward therefor are just exemplified, and various rewards may be provided based on the dart game execution result of the player.

In addition, the dart game apparatus 100 may transmit data regarding the character to which the reward is provided to at least one of the dart game server 200, the mobile game server 300, and the mobile terminal 400 (830). The data of the character receiving the reward is transmitted to the dart game server 200, the mobile game server 300, and the mobile terminal 400, and thus the player may execute the mobile game by the character on the mobile game. The player may grow the character which may be used on the mobile game by playing the dart game apparatus 100.

Figure 11:
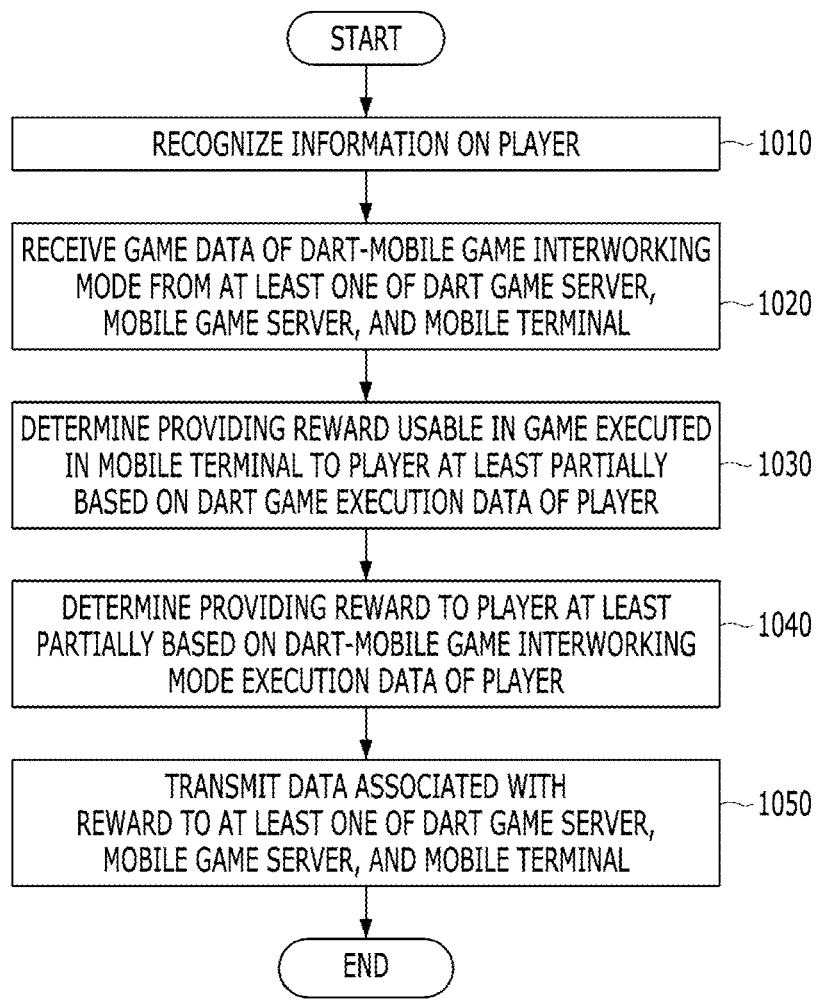
FIG. 11 is a flowchart for providing a dart-mobile game interworking mode according to yet another embodiment of the present disclosure.

FIG. 11 is a flowchart for providing a dart-mobile game interworking mode according to yet another embodiment of the present disclosure.

The dart game apparatus 100 may recognize player information (1010). The player information may be based on at least one of an e-mail account of the player, a social network service (SNS) account, a mobile messenger account, an identification (ID) of the player, and identification information of the player. The dart game apparatus 100 may specify the player through the player information. The dart game apparatus 100 may receive game data of the dart-mobile game interworking mode from at least one of the dart game server, the mobile game server, and the mobile terminal (1020). The game data of the dart-mobile game interworking mode may include event data on the mobile game. For example, a battle with the boss monster on the mobile game, a match-up between the players of the mobile game, and the like may become event data. As illustrated in FIG. 8, the display module 142 may display the boss monster 710. In this case, the player may perform the battle with the boss monster 710 by a dart game method. The dart-mobile game interworking mode may be a game mode which may execute the event on the mobile game by a dart game method on the dart game apparatus 100 as described with reference to FIG. 8.

The dart game apparatus 100 may determine providing a reward which may be used on the game executed on the mobile terminal for the player at least partially based on the data game execution data of the player (1030). The dart game execution data of the player may be at least partially based on at least one of information on the number of dart game execution times of the player, information on a dart game winning rate of the player, information on dart game accuracy rate of the dart game of the player, information on throwing speed of the dart pin of the player, information on a dart game score of the player, and information on ranking of the player. The reward which may be used on the game executed on the mobile terminal may include at least one of a paid charging item, a game item, a coin for the game, a character, an experience value of the character, and an item required for the game progress, which are used on the game executed on the mobile terminal. For example, the throwing speed of the dart pin of the player is measured and a higher coin for the mobile game may be provided as the measurement speed is increased based thereon. The aforementioned dart game execution data and the reward therefor are just exemplified, and various rewards may be provided based on the dart game execution result of the player.

The dart game apparatus 100 may determine providing a reward for the player at least partially based on the dart-mobile game interworking mode execution data of the player (1040). The dart game apparatus 100 may handle the event on the mobile game to be clear in the case where the player performs the dart-mobile game interworking mode by a dart game method and achieves a specific winning condition in the dart game. For example, the player of the mobile game may perform a battle with the boss monster in the mobile game by the dart game method in the dart game apparatus 100 by using the dart-mobile game interworking mode. In this case, the dart game apparatus 100 may determine that the player wins in the battle with the boss monster in the case of achieving the winning condition (for example, 300 scores or more) in the dart game (for example, a count-up game). The dart game apparatus 100 may provide a reward to the player at least partially based on the dart-mobile game interworking mode execution data. In this case, the reward may include a reward which may be used on the mobile game. In this case, the reward may be a higher reward (for example, providing 150 gold when the battle with the boss monster is performed through the dart-mobile game interworking mode) than a case (for example, providing 100 gold as the reward in this case) when the player executes the mobile game event (for example, a battle with a boss monster) on the mobile terminal. The event on the mobile game is just an example, and various events which may be executed on the mobile game may be executed in the dart game apparatus 100 through the dart-mobile game interworking mode. The aforementioned reward is just an example, and the dart game apparatus may generally provide a higher reward when the event is executed through the dart-mobile game interworking mode than when the event on the mobile game is executed on the mobile terminal.

The dart game apparatus 100 may transmit data related with the reward to at least one of the dart game server 200, the mobile game server 300, and the mobile terminal 400 (1050). The data related with the reward is transmitted to the dart game server 200, the mobile game server 300, and the mobile terminal 400, and thus the player may execute the mobile game by receiving the reward for the mobile game. The player may obtain a reward including items which may be used on the mobile game and the like by playing the dart game apparatus 100.

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

Those skilled in the art of the present disclosure will appreciate that various exemplary logic blocks, modules, processors, means, circuits, and algorithm steps can be implemented by electronic hardware, various types of programs or design codes (designated as "software" herein for easy description), or a combination thereof described in association with the embodiments disclosed herein. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various embodiments or features presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include a wireless channel and various other media that can store, posses, and/or transfer command(s) and/or data, but are not limited thereto. It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is consistent with the principles and new features presented herein.

MODE FOR INVENTION

Related contents in the best mode for carrying out the present disclosure are described.

INDUSTRIAL APPLICABILITY

The present disclosure may be used in a digital device, a dart device, a dart game apparatus, an entertainment device, a dart server, and the like.

The invention claimed is:

1. A dart game device for interworking with a dart game and a mobile game, the dart game device comprising:
   a processor configured to recognize information on a player and determine a reward to the player at least partially based on dart game execution data of the player and execution data of a dart-mobile game interworking mode of the player; and
   a transceiver configured to transmit data associated with the reward to the player to at least one of a dart game server, a mobile game server, and a mobile terminal, and to receive game data of the dart-mobile game interworking mode from at least one of the dart game server, the mobile game server, and the mobile terminal,
   wherein the reward to the player includes an additional reward for a game executed on the mobile terminal, and the game data of the dart-mobile game interworking mode includes event data that is executable in the mobile terminal.

2. The dart game device of claim 1, wherein the reward to the player includes at least one of a charged billing item, a game item, a coin for the dart game, a character of the player, an experience value of the character, and an item required for a progress of the dart game used in the game executed on the mobile terminal.

3. The dart game device of claim 1, wherein the information on the player is based on at least one of an e-mail account of the player, a social network service (SNS) account of the player, a mobile messenger account of the player, an identification (ID) of the player, and identification information of the player.

4. The dart game device of claim 1, wherein the dart game execution data of the player is at least partially based on at least one of information on a number of dart game execution times of the player, information on a dart game winning rate of the player, dart game accuracy rate information of the dart game of the player, throwing speed information of a dart pin of the player, dart game score information of the player, and ranking information of the player.

5. The dart game device of claim 1, wherein the dart-mobile game interworking mode includes a game mode to perform an event in the game that is executable in the mobile terminal in a dart game pattern at least partially based on the game data.

6. The dart game device of claim 1, wherein the reward to the player is higher than a reward when the event in the game that is executable in the mobile terminal is performed in the mobile terminal.

7. The dart game device of claim 1, wherein the processor is further configured to:
   create or load a character of the player, and
   determine a reward to the character at least partially based on the dart game execution data of the player; and
   the transceiver is further configured to transmit data regarding the character to which the reward to the character is provided to at least one of the dart game server, the mobile game server, and the mobile terminal.

8. The dart game device of claim 7, wherein the reward to the character includes a game item, a coin for the dart game, an experience value of the character, and a reward for the dart game, which may be used for changing the character and a growth of the character.

9. A method for interworking with a dart game and a mobile game, the method comprising:
   recognizing information on a player;

determining a reward to the player at least partially based on dart game execution data of the player and execution data of a dart-mobile game interworking mode of the player;

transmitting data associated with the reward to the player to at least one of a dart game server, a mobile game server, and a mobile terminal, and receiving game data of the dart-mobile game interworking mode from at least one of the dart game server, the mobile game server, and the mobile terminal, wherein the reward to the player is usable in a game executed on the mobile terminal, and the game data of the dart-mobile game interworking mode includes event data that is executable in the mobile terminal.

10. The method of claim 9, further comprising:

creating or loading a character of the player;

determining a reward to the character at least partially based on the dart game execution data of the player; and transmitting data regarding the character to which the reward to the character is provided to at least one of the dart game server, the mobile game server, and the mobile terminal.

11. A non-transitory computer-readable medium including code for performing a process of allowing a computer to interwork with a dart game and a mobile game, the process comprising:

recognizing information on a player;

determining a reward to the player at least partially based on dart game execution data of the player and execution data of a dart-mobile game interworking mode of the player;

transmitting data associated with the reward to the player to at least one of a dart game server, a mobile game server, and a mobile terminal, and receiving game data of the dart-mobile game interworking mode from at least one of the dart game server, the mobile game server, and the mobile terminal, wherein the reward to the player is usable in a game executed on the mobile terminal, and the game data of the dart-mobile game interworking mode includes event data that is executable in the mobile terminal.

12. The non-transitory computer-readable medium of claim 11, the process further comprising:

creating or loading a character of the player;

determining a reward to the character at least partially based on the dart game execution data of the player; and transmitting data regarding the character to which the reward to the character is provided to at least one of the dart game server, the mobile game server, and the mobile terminal.

13. A dart game server comprising:

a processor configured to recognize information on a player and determine a reward to the player at least partially based on dart game execution data of the player and execution data of a dart-mobile game interworking mode of the player; and a transceiver configured to receive the dart game execution data from a dart game device and transmit data associated with the reward to the player to at least one of a mobile game server and a mobile terminal, and to receive game data of the dart-mobile game interworking mode from at least one of the dart game server, the mobile game server, and the mobile terminal, wherein the reward to the player includes an additional reward for a game executed on the mobile terminal, and the game data of the dart-mobile game interworking mode includes event data on the mobile game that is executable in the mobile terminal.

14. The dart game server of claim 13, further comprising:

memory configured to store data regarding a character to which a reward to the character is provided;

the processor being further configured to:
create or load the character of the player, and
determine the reward to the character of the player at least partially based on the dart game execution data of the player; and the transceiver being further configured to transmit the data regarding the character to at least one of the mobile game server and the mobile terminal.

* * * * *